US008950803B2

(12) United States Patent
Herzberg et al.

(10) Patent No.: US 8,950,803 B2
(45) Date of Patent: Feb. 10, 2015

(54) DRIVER ROOF FOR THE CONTROL PLATFORM OF A ROAD MAKING MACHINE

(71) Applicant: Joseph Voegele AG, Ludwigshafen/Rhein (DE)

(72) Inventors: Ingo Herzberg, Angelbachtal (DE); Thomas Schmidt, Plankstadt (DE)

(73) Assignee: Joseph Voegele AG (DE)

( * ) Notice: Subject to any disclaimer, the term of this patent is extended or adjusted under 35 U.S.C. 154(b) by 0 days.

(21) Appl. No.: 13/859,126

(22) Filed: Apr. 9, 2013

(65) Prior Publication Data
US 2013/0270872 A1    Oct. 17, 2013

(30) Foreign Application Priority Data
Apr. 12, 2012  (DE) .................... 20 2012 003 669 U

(51) Int. Cl.
  *B60J 7/10*  (2006.01)
  *B60J 7/16*  (2006.01)
  *B62D 33/06* (2006.01)
  *B60J 3/00*  (2006.01)
  *B60J 7/04*  (2006.01)
(52) U.S. Cl.
  CPC ............... *B60J 7/16* (2013.01); *B62D 33/0617* (2013.01); *B60J 3/002* (2013.01); *B60J 7/041* (2013.01)
  USPC ........................................................ 296/210
(58) Field of Classification Search
  CPC ...................................................... B62D 25/06
  USPC .................... 296/210, 154, 190.01, 190.03
  See application file for complete search history.

(56) References Cited

U.S. PATENT DOCUMENTS

| 1,425,954 | A | * | 8/1922 | Fischer | 296/99.1 |
|---|---|---|---|---|---|
| 2,741,195 | A | * | 4/1956 | Hartzner | 52/66 |
| 4,010,973 | A | * | 3/1977 | Heinrich | 296/161 |
| 4,060,261 | A |   | 11/1977 | Bauer et al. | |
| 4,201,412 | A | * | 5/1980 | Williams et al. | 296/163 |
| 4,415,197 | A | * | 11/1983 | Meyer | 296/216.02 |
| 4,600,236 | A |   | 7/1986 | Weiss et al. | |
| 4,848,827 | A | * | 7/1989 | Ou | 296/99.1 |
| D317,011 | S | * | 5/1991 | Boddin et al. | D15/30 |
| 5,443,300 | A | * | 8/1995 | Mohammed | 296/97.4 |
| 6,149,228 | A |   | 11/2000 | O'Neill et al. | |
| 6,193,437 | B1 | * | 2/2001 | Heims | 404/110 |
| 6,322,133 | B1 | * | 11/2001 | Yantek et al. | 296/190.03 |
| 6,341,811 | B1 | * | 1/2002 | Schoelkopf | 296/154 |
| 6,582,009 | B2 |  | 6/2003 | Wezyk et al. | |
| 6,688,682 | B2 |  | 2/2004 | Arthur et al. | |

(Continued)

FOREIGN PATENT DOCUMENTS

DE   930150 C   7/1955
DE   7427457 U  12/1974

(Continued)

OTHER PUBLICATIONS

German Search Report Dated Apr. 12, 2012, Application No. 20 2012 003 669.6, Applicant Joseph Voegele AG, 5 Pages.

(Continued)

*Primary Examiner* — Hilary Gutman
(74) *Attorney, Agent, or Firm* — Brooks Kushman P.C.

(57) ABSTRACT

A driver roof for a control platform of a road making machine comprises a first roof module and a second roof module which are connected to each other permanently or detachably for forming a common driver roof.

18 Claims, 3 Drawing Sheets

(56) References Cited

U.S. PATENT DOCUMENTS

| | | | |
|---|---|---|---|
| 6,782,904 B2 * | 8/2004 | Tien | 135/88.07 |
| D531,647 S * | 11/2006 | Stender et al. | D15/30 |
| D554,158 S * | 10/2007 | Ewringmann | D15/30 |
| 7,731,273 B2 * | 6/2010 | Hagele et al. | 296/190.1 |
| RE43,249 E * | 3/2012 | Ewringmann | D15/30 |
| D670,744 S * | 11/2012 | Ewringmann | D15/30 |
| 8,579,364 B2 * | 11/2013 | Fukudome et al. | 296/190.08 |

FOREIGN PATENT DOCUMENTS

| | | |
|---|---|---|
| DE | 20000993 U1 | 3/2000 |
| DE | 10113427 A1 | 10/2002 |
| EP | 0151332 A1 | 8/1985 |
| EP | 1008493 A2 | 6/2000 |
| EP | 1008504 A1 | 6/2000 |
| EP | 1288044 A2 | 3/2003 |
| FR | 2339711 A1 | 8/1977 |
| JP | 07228149 A | 8/1985 |
| JP | 08142785 A | 6/1996 |
| JP | 11075440 A | 3/1999 |
| JP | 11189046 A | 7/1999 |

OTHER PUBLICATIONS

Extended European Search Report Dated Apr. 4, 2014, Application No. 13001747.8-1750 / 2650196, Applicant Joseph Vögele AG, 6 Pages.

Japanese Office Action Dispatched May 13, 2014, Application No. 2013-069548, 3 Pages.

* cited by examiner

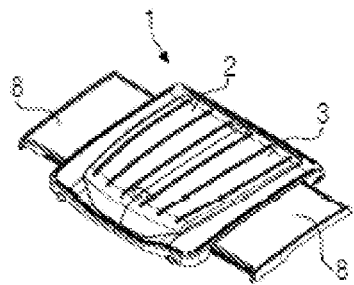
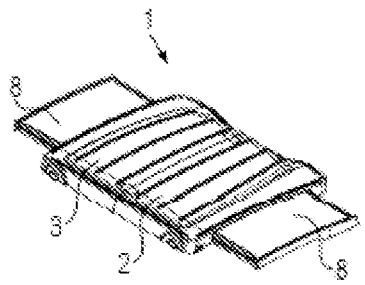
FIG. 4　　　　FIG. 5
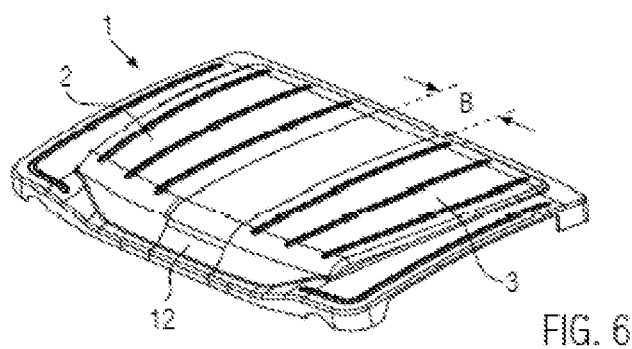
FIG. 6
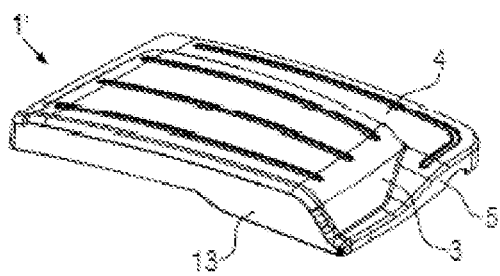
FIG. 7

DRIVER ROOF FOR THE CONTROL PLATFORM OF A ROAD MAKING MACHINE

CROSS-REFERENCE TO RELATED APPLICATIONS

This application claims foreign priority benefits under 35 U.S.C. §119(a)-(d) to German patent application number DE 20 2012 003 669.6, filed Apr. 12, 2012, which is incorporated by reference in its entirety.

TECHNICAL FIELD

The present disclosure relates to a driver roof for a control platform of a road making machine, which road making machine can in particular be a road finishing machine or a charger for a road making machine.

BACKGROUND

Road making machines are employed independent of current weather conditions. Therefore, the operators of these road making machines are always exposed to the weathering conditions. The use of driver-protecting roofs or driver roofs, however, largely offers protection for the operators located on the driver's cabin of the road making machine.

SUMMARY

It is an object of the disclosure to provide a driver roof that is improved in view of the efficiency of its manufacture.

The driver roof according to the disclosure comprises a first roof module and a second roof module. These can be connected to each other either permanently or detachably to form a common roof. While at first sight this seems to be more complicated than the conventional manufacture of an integral driver roof, the disclosure indeed offers advantages for the efficiency of the manufacture. As will be illustrated more in detail below, for example differently designed driver roofs for various types of road making machines can be easily produced from equal roof modules. This facilitates warehousing, because separate, complete drivers roofs no longer need to be stored for all types of road making machines. Moreover, the individual roof modules are smaller than a complete driver roof which further facilitates warehousing.

For the manufacture, it is particularly efficient for the two roof modules to be laterally reversed (i.e., mirror images) with respect to each other because similar tools and conditions for the manufacture of the two roof modules can then be employed.

Suitably, each roof module comprises a roof section and at least one, preferably three lateral sections angled with respect to the roof section. The lateral sections can project, for example, downwards from the roof section and offer additional protection against sunshine and rain.

The use of the driver roof can become more flexible if a roof module comprises at least one extension part that is movable between a retracted and an extended position. This extension part (also referred to as awning) can preferably be lockable in at least one position, for example in the refracted position. For locking, conventional locking systems can be used, such as a snap-on fastening or a rear trunk lock.

The efficiency of the manufacture of driver roofs for various types of road making machines can be considerably facilitated if an intermediate part is inserted between the two roof modules. This intermediate part can be inserted between the two roof modules either permanently or detachably.

The efficiency of the manufacture of differently designed driver roofs is even further improved if several exchangeable intermediate parts are available that can be inserted between the two roof modules and are of different configurations or widths. Depending on the width of the road making machine to be provided with the driver roof, a suited intermediate part can be used.

It is furthermore advantageous to have a cover that can be attached to a roof module. This is advantageous mainly if a roof module can be fixed to the road making machine separately and independent of the other roof module. The cover can then offer protection against sunshine or rain with the side otherwise covered by the other roof module.

Preferably, at least one lamp is provided at one roof module by means of which the driver's cabin and/or the working region of the road making machine can be illuminated. These lamps can be halogen, xenon or LED lights or other suited lamps.

As the material for the driver roof, plastics, in particular glass-fiber reinforced plastics (GFRP), composite materials or metal have proven to be particularly advantageous.

For a permanent connection of the two roof modules with each other, threaded joints, welded joints or riveted joints are particularly suited. A more variable employment of the driver roof results from a hinged connection between the two roof modules by which, for example, a first roof module can be pivoted onto the other roof module to reduce the size of the driver roof.

The disclosure furthermore relates to a road making machine, in particular a road finishing machine or a charger for a road finishing machine, which are equipped with a driver roof of the above-described type.

Moreover, the disclosure also relates to a modular system for manufacturing a driver roof for the control platform of a road making machine. This modular system that improves the efficiency of the manufacture of the driver roof comprises a first and second roof modules and at least one intermediate part which can be inserted between the two roof modules. From this modular system, either the two roof modules can be optionally connected with each other directly, or they can be connected with each other by insertion of the at least on intermediate part.

The manufacture of different driver roofs becomes particularly versatile if the modular system comprises different intermediate parts each having different widths.

Below, advantageous embodiments of the disclosure will be illustrated in more detail with reference to the attached drawings.

BRIEF DESCRIPTION OF THE DRAWINGS

FIG. 4 is a perspective view of the driver roof of FIG. 1 with extended extension parts;

FIG. 5 is the driver roof shown in FIG. 4 with extended extension parts in a perspective rear view;

FIG. 6 is a further embodiment of a driver roof with inserted intermediate part;

FIG. 7 is a further embodiment of a driver roof with only one roof module; and

DETAILED DESCRIPTION

Figures 1, 2:
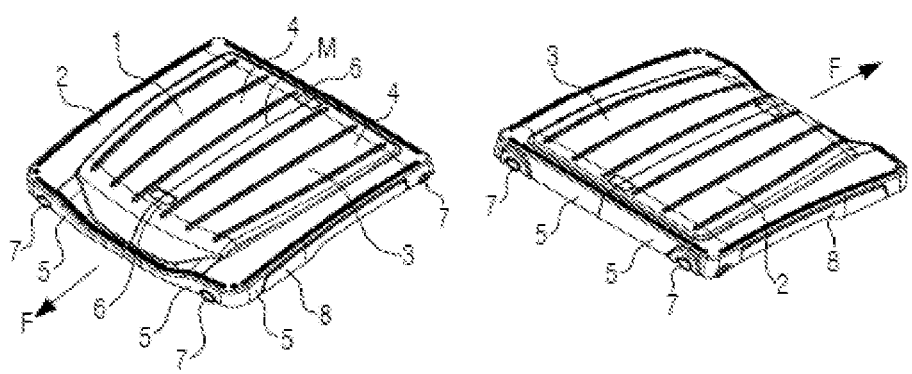
FIG. 1 is a driver roof according to the disclosure in a perspective front view.
FIG. 2 is the driver roof of FIG. 1 in a perspective rear view.

FIG. 1 shows, in a perspective view diagonally from the front, an embodiment of a driver roof 1 according to the disclosure for a road making machine. For orientation purposes, the common direction of motion F of the road making machine is drawn in the form of an arrow.

The driver roof 1 comprises a first roof module 2 and a second roof module 3 which are laterally reversed in the present embodiment. Each roof module 2, 3 has a roof section 4 from which lateral parts 5 angled with respect to a roof section 4 project downwards on three sides. These lateral sections 5 offer additional protection against rain and sunshine.

Along a central line M extending in the direction of motion F, the two roof modules 2, 3 are connected to each other permanently or, as an alternative, detachably via connecting elements 6. The connecting elements 6 can be detachable locking mechanisms, a welded joint, a riveted joint or hinges. In case of a hinge connection 6, it would be conceivable that the one roof module 2 can be pivoted about the central axis M onto the second roof module 3.

On the front side and at the sides of the driver roof 1, lamps 7 are provided which can be LED headlights. A cable harness (not represented) supplies the lamps 7 with power.

FIG. 2 shows a rear perspective view of the driver roof shown in FIG. 1. One can see there that lamps 7 are also located on the back side of the two roof modules 2, 3.

Figure 3:
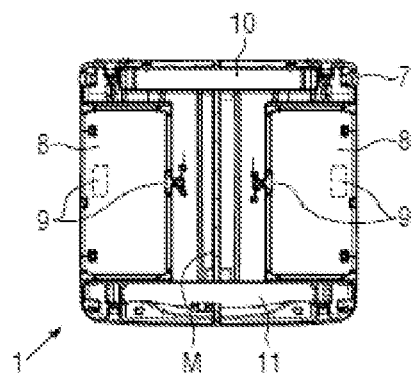
FIG. 3 is a bottom view of the driver roof shown in FIGS. 1 and 2.

FIG. 3 shows a bottom view of the driver roof shown in FIGS. 1 and 2. Here, one can see extension parts 8 which are in FIG. 3 located in a position retracted into the driver roof 1 and are locked there by means of a locking mechanism 9. Crossbars 10, 11 connect the two roof modules 2, 3 to each other.

FIG. 4 shows a perspective front view of the driver roof 1 represented in FIG. 1, where now, however, the two extension parts 8 have been brought to their extended positions. In this extended position, they increase the effective width of the driver roof 1.

FIG. 5 shows a rear perspective view of the driver roof 1 with extended extension parts or awnings 8. These extension parts or awnings 8 can be mounted to slide in rail guides.

FIG. 6 shows a second embodiment of a driver roof 1 according to the disclosure. The latter also comprises a first roof module 2 and a second roof module 3 which each have the same shape as the first and the second roof modules 2, 3 according to FIG. 1. The extension parts 8 and the lamps are not represented. Moreover, the driver roof 1 according to FIG. 6 comprises an intermediate part 12 which is inserted between the two roof modules 2, 3 and permanently or detachably fixed to it. The intermediate part 12 can be selected from a modular system which comprises several intermediate parts 12 of different widths B. This permits to determine the overall width of the driver roof 1 by selecting a certain intermediate part 12 and to produce driver roofs 1 of different overall widths by simple warehousing.

FIG. 7 shows a further embodiment of a driver roof 1'. This driver roof only comprises one of the two roof modules 2, 3—in the present embodiment the left, second roof module 3, seen in the direction of motion. The other roof module 2 has been removed to create space for higher superstructures on the road making machine. This offers itself, for example, when space for a spraying module on a spraying road finishing machine is to be created temporarily. On the side of the roof module 3 normally facing the other roof module 2 and not provided with a lateral section 5, a cover or light-shade 13 can now be mounted, in particular to be detachable, which projects downwards from the roof section 4 of the roof module 3 and has the same function as the lateral parts 5 on the other sides. This embodiment can, but does not have to, be provided with extension parts 8.

Figure 8:
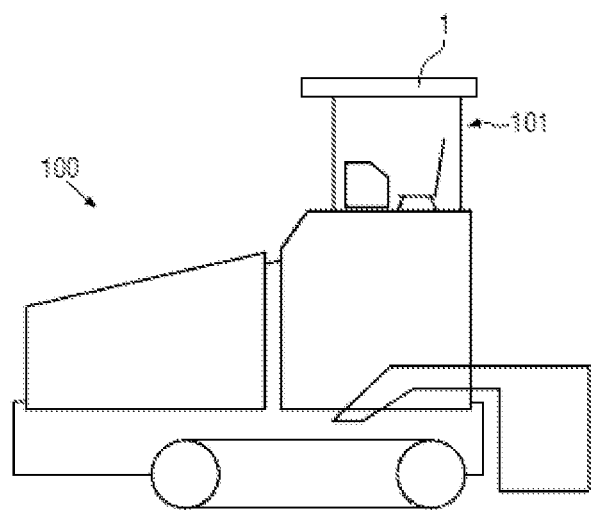
FIG. 8 is a schematic representation of a road making machine with a driver roof.

FIG. 8 shows, in a schematic representation, an embodiment of a road making machine 100 according to the disclosure in the form of a road finishing machine with a driver roof 1 according to the disclosure for the control platform 101 of the road finishing machine 100.

In each embodiment, either one of the two roof modules 2, 3 can be embodied independent of the other roof module 2, 3 with or without an extension part 8. So, it is conceivable that the driver roof 1 has an extension part or awning 8 on only one side or on both sides, or that it has no extension part 8 on any side. If a roof module 2, 3 does not include any extension part 8, its side oriented in parallel to the direction of motion F is suitably provided with a lateral section 5 which is drawn down to the same extent as the other sides in order to shield the operators from weathering influences, such as rain, snow or sunshine, in particular on this side.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A driver roof for a control platform of a road making machine, the driver roof comprising:
   a first roof module and a second roof module which are hingedly connected to each other permanently or detachably along a central line extending in the direction of motion of the road making machine for forming a common driver roof, wherein the first roof module can be pivoted about the central line onto the second roof module.

2. The driver roof according to claim 1 wherein the two roof modules are laterally reversed with respect to each other.

3. The driver roof according to claim 1 wherein each roof module comprises one roof section and at least one lateral section angled or bent with respect to the roof section.

4. The driver roof according to claim 3 wherein at least one of the roof modules comprises three lateral sections angled or bent with respect to the roof section.

5. The driver roof according to claim 1 wherein at least one of the first and the second roof modules comprises an extension part which is movable between a refracted and an extended position.

6. The driver roof according to claim 5 wherein each extension part can be locked in at least one position.

7. The driver roof according to claim 1 wherein at least one of the first and the second roof modules is formed without an extension part.

8. A road making machine comprising the driver roof according to claim 1.

9. The driver roof according to claim 1 further comprising an additional cover that is mountable on one of the roof modules.

10. The driver roof according to claim 1 further comprising at least one lamp provided at at least one of the two roof modules.

11. The driver roof according to claim 1 wherein at least one of the roof modules is made of plastics, a composite material, metal or glass-fiber reinforced plastics.

12. The driver roof according to claim 1 wherein one roof module is permanently connected with another roof module by at least one connecting element.

13. The driver roof according to claim 12 wherein the at least one connecting element comprises a hinge.

14. A road making machine comprising:
   a control platform; and
   a driver roof positioned over the control platform, the driver roof comprising a first roof module and a second roof module that are hingedly connected to each other permanently or detachably along a central line extending in the direction of motion of the road making machine, wherein the first roof module can be pivoted about the central line onto the second roof module.

15. The road making machine according to claim 14 wherein the road making machine is a road finishing machine or a charger for a road finishing machine.

16. A modular system for manufacturing a driver roof for a control platform of a road making machine, the modular system comprising:
   a first roof module;
   a second roof module; and
   at least one intermediate spacer part;
   wherein the two roof modules can selectively be connected to each other without an intermediate spacer part to form a driver roof with a first width, or each be connected with one of the at least one intermediate spacer part to form a driver roof with a second width greater than the first width.

17. The modular system according to claim 16 wherein the at least one intermediate spacer part comprises several intermediate spacer parts of different configurations or different widths.

18. The modular system according to claim 17 wherein the two roof modules can each selectively be connected with any one of the several intermediate spacer parts.

* * * * *

UNITED STATES PATENT AND TRADEMARK OFFICE
CERTIFICATE OF CORRECTION

| | |
|---|---|
| PATENT NO. | : 8,950,803 B2 |
| APPLICATION NO. | : 13/859126 |
| DATED | : February 10, 2015 |
| INVENTOR(S) | : Ingo Herzberg et al. |

It is certified that error appears in the above-identified patent and that said Letters Patent is hereby corrected as shown below:

In the Claims

Column 4, Line 53, Claim 5:

After "which is movable between a"
Delete "refracted" and
Insert -- retracted --.

Signed and Sealed this
Ninth Day of June, 2015

Michelle K. Lee
*Director of the United States Patent and Trademark Office*